United States Patent [19]

Punt

[11] Patent Number: 5,664,474
[45] Date of Patent: Sep. 9, 1997

[54] BREAD SLICING GUIDE

[76] Inventor: Neal Punt, 12194 104th Ave., Grand Haven, Mich. 49417

[21] Appl. No.: 503,449

[22] Filed: Jul. 17, 1995

[51] Int. Cl.$^6$ .............................. B26B 29/06; A47J 47/00
[52] U.S. Cl. ........................... 83/761; 83/781; 83/932; 269/54.5; 269/290; 425/292; D7/673
[58] Field of Search .................... 83/451, 761, 762, 83/781, 932, 870, 565, 614, 821, 829, 914; 206/551, 560; 220/4.03, 551, 554; 269/288, 290, 293, 294, 295, 54.5, 289 R, 302.1; D7/672, 673; 249/102, 117, 155, DIG. 1; 425/292

[56] References Cited

U.S. PATENT DOCUMENTS

| D. 299,995 | 2/1989 | Rainville | D7/673 |
|---|---|---|---|
| D. 316,657 | 5/1991 | Mulherin | D7/673 |
| 495,872 | 4/1893 | Ball | 249/117 |
| 1,602,573 | 10/1926 | Craig | 83/409 |
| 1,702,144 | 2/1929 | Weston | 269/302.1 |
| 2,206,154 | 7/1940 | Bixler | 83/762 |
| 2,722,713 | 11/1955 | Oestermeyer | 249/102 X |
| 2,816,588 | 12/1957 | Miron | 83/761 |
| 2,978,809 | 4/1961 | Dunnet | D7/673 X |
| 2,978,810 | 4/1961 | Dunnet | D7/673 X |
| 2,978,811 | 4/1961 | Dunnet | D7/673 X |
| 2,992,667 | 7/1961 | Burrows | 269/54.5 |
| 3,347,296 | 10/1967 | Rothman | 269/87.2 |
| 3,596,354 | 8/1971 | Emerson | 83/451 |
| 3,821,061 | 6/1974 | Schier | 269/54.5 |
| 3,837,775 | 9/1974 | Boucher | D7/672 X |
| 3,987,541 | 10/1976 | Sieczkiewicz | 30/114 |
| 3,995,844 | 12/1976 | Hellman | 269/54.5 |
| 4,930,759 | 6/1990 | Potter et al. | 269/289 R X |
| 5,431,078 | 7/1995 | Ricard et al. | 83/870 |
| 5,514,443 | 5/1996 | Chen | 269/289 R X |

FOREIGN PATENT DOCUMENTS

| 15140 | of 1891 | United Kingdom | 269/54.5 |
|---|---|---|---|
| 177061 | 3/1922 | United Kingdom | 83/821 |

Primary Examiner—Rinaldi I. Rada
Assistant Examiner—Clark F. Dexter
Attorney, Agent, or Firm—Price, Heneveld, Cooper, DeWitt and Litton

[57] ABSTRACT

A bread loaf retainer and slicing knife guide comprising a horizontal support surface and a surrounding vertical rim, the support surface having a plurality of spaced, upwardly projecting, bread loaf penetrating protrusions to retain the end of a loaf of bread in fixed position on the support surface, the vertical rim extending above the support surface a specific amount substantially equal to the desired bread slice thickness, and having an upper edge forming a coplanar guide for engagement by a bread knife in continuous contact therewith to cut a slice of uniform thickness. In one embodiment, a ring telescopically interfits with the rim and has a height greater than the rim to extend above the rim, and has an upper edge forming a guide surface for the bread knife to allow slicing of a bread slice to a uniform thickness. In another embodiment, a second vertical rim extends downwardly from the support surface a different amount than the first rim and has a second guide surface for a bread knife, the support surface also having a second set of projecting bread loaf penetrating protrusions generally parallel to the second vertical rim such that by inverting the bread loaf retainer, and holding the end of a bread loaf thereon, a uniform slice of bread of different thickness can be cut.

2 Claims, 2 Drawing Sheets

BREAD SLICING GUIDE

BACKGROUND OF THE INVENTION

This invention relates to a bread slicing guide device.

Over the years, various retaining devices for slicing food products such as bread, croissants and bagels have been proposed. Slicing of croissants and bagels basically requires a holder for securing the food while it is sliced in half, doing so in a fashion to avoid cutting oneself. Slicing of bread, however, is usually commercially done by a machine with multiple blades, but when it is made at home, as in a bread machine, it is sometimes manually sliced using a loaf retainer that has a plurality of spaced, upstanding panels or spring legs and intermediate slots somewhat like the bagel slicing guide in U.S. Pat. No. Design. 316,657, but large enough to accept a loaf of bread. Such a retainer does have certain disadvantages, however, including being rather large to store and limited to one slice thickness size.

SUMMARY OF THE INVENTION

An object of this invention is to provide an inexpensive, simple, yet effective manual bread slicing retainer and guide for slicing uniform slices of bread, even of different selected thicknesses.

The bread loaf retainer and knife guide comprises a horizontal support surface having a plurality of spaced, upwardly extending bread penetrating protrusions, and an upstanding surrounding rim of a height to equal the bread slice thickness desired, the rim upper surface forming a knife guide surface thereacross.

The rim can extend both upwardly and downwardly of the support surface, but in different amounts, while the support surface has protrusions projecting in opposite directions, both upwardly and downwardly thereof, enabling the device to be inverted to one position or the other for selected bread slice thickness cutting. Alternatively, bread slices of different selected thickness can be provided by having an extra upstanding ring that interfits telescopically with the product rim to form a higher knife guide surface.

These and other objects, advantages and features of the invention will become apparent upon studying the following specification in conjunction with the drawings.

DESCRIPTION OF THE PREFERRED EMBODIMENTS

Figure 1:
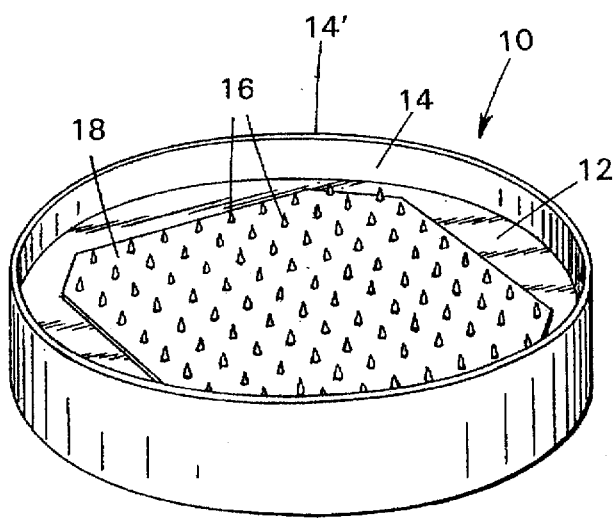
FIG. 1 is a perspective view of the first embodiment of this invention.
Figure 2:
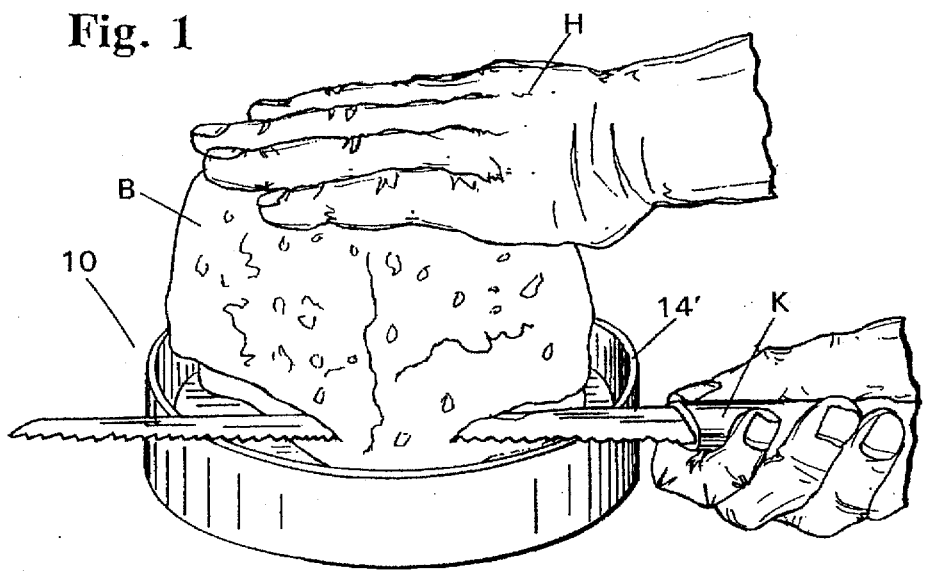
FIG. 2 is a perspective view of the first embodiment shown in use.
Figure 3:
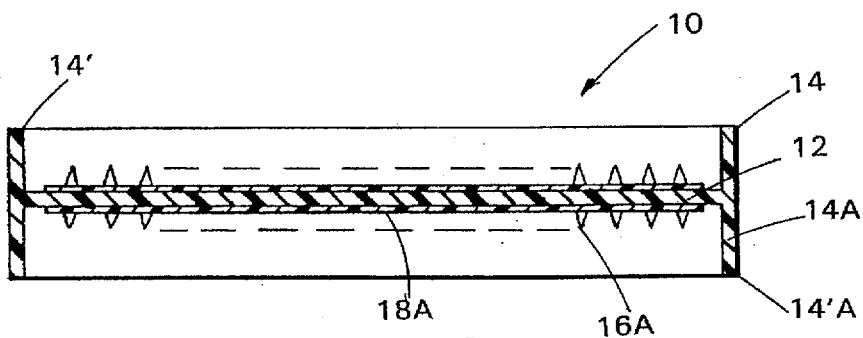
FIG. 3 is a cross sectional view of the first embodiment in FIGS. 1 and 2.

Referring now to FIGS. 1–3, there is depicted a bread slicing retainer and guide comprising a horizontal support surface 12, here shown to be circular in configuration, surrounded by a vertical rim 14 extending upwardly from support surface 12 and having a coplanar upper edge 14' equidistant in all areas from support platform 12.

Projecting upwardly from support platform 12 are a plurality of spaced bread loaf penetrating protrusions 16 fabricated, for example, integral with an underlying sheet 18 which is secured as by adhesive to surface 12, or is integral with surface 12 to form part of the support for a bread loaf to be placed thereon. These are generally parallel to rim 14, normal to surface 12.

This first embodiment is shown to comprise a polymeric material, preferably a molded plastic, i.e., polymer, selected from any of a wide variety of materials presently available. The protrusions can also be polymeric, molded integral with the sheet from which they protrude.

In FIG. 3, rim 14 is shown to not only extend vertically upwardly from support surface 12 but also downwardly at 14a from support surface 12. Also, a plurality of projections 16a on support sheet 18a project downwardly generally parallel to rim 14a and normal to surface 12. The vertical dimension of downwardly extending rim 14a is shown to be greater than the upwardly extending vertical dimension of rim 14. The bottom surface 14'a is coplanar, being equidistant vertically from surface 12.

In use, a loaf of bread B is placed vertically on the support surface, one end up and the other end down, and pressed down manually as by hand H sufficient to cause protrusions 16 to penetrate the lower end of the loaf. The blade of a knife K is then placed horizontally on upper edge 14' and passed through the bread with a sawing motion, continuing to maintain the blade in contact with rim surface 14' such that a uniform slice of bread substantially equal in thickness to the height of rim 14 is severed from the loaf. The protrusions hold the loaf in position while it is being cut. The loaf is then removed, and the cut slice is retrieved. If another slice is to be cut, the bread loaf is replaced on and held down on support 12 and another slice cut.

If a thicker slice is desired, the retainer and guide 10 are inverted such that upper edge 14' rests on a support surface, and lower edge 14'a is now oriented upwardly to serve as the horizontal guide for knife K while the bread is held endwise on protrusions 16a.

An alternative embodiment is depicted in FIGS. 4–7. This embodiment may be formed, for example, of thin sheet metal. Specifically, the bread slicing retainer and guide assembly 50 is shown to comprise a lower pan-type element 52 and a cooperative ring element 54. Pan element 52 includes a horizontal support panel or surface 56 and a peripheral upstanding rim 58 integral with surface 56 and optionally including a bead 58' on the upper edge forming the guide surface for a knife K. Upper edge 58' is coplanar, being equally spaced at all portions thereof from support panel 56 to enable a uniform thickness slice to be formed. Protruding upwardly from the bottom of the pan are a plurality of spaced protrusions 60. These protrusions may be formed directly into bottom surface 56 by forcing a punch, for example, through layer 56 to cause the metal to deform normal to surface 56 into hollow protrusions. A desired number of these spaced protrusions may be formed.

In use, a loaf of bread is placed endwise down on protrusions 60 with sufficient force to cause these protrusions to penetrate the bread loaf, thereby holding it secure against lateral shifting or rotation while the blade of knife K is passed through the bread while in continuous contact with the upper edge 58'. The bread loaf is then removed and the cut slice retrieved.

Figure 4:
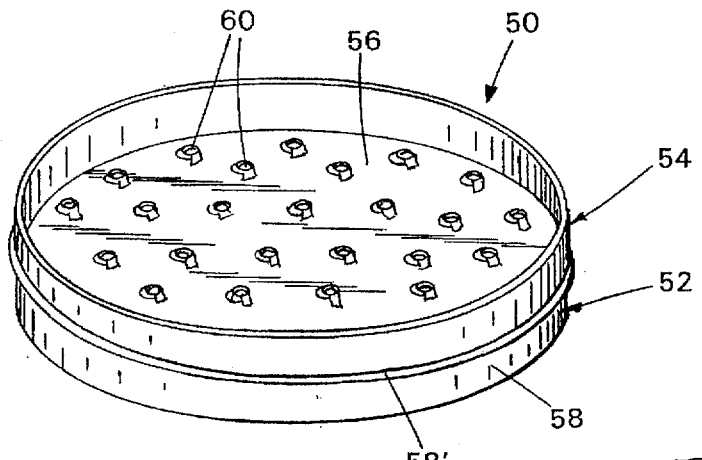
FIG. 4 is a perspective view of a second embodiment of this invention.
Figure 5:
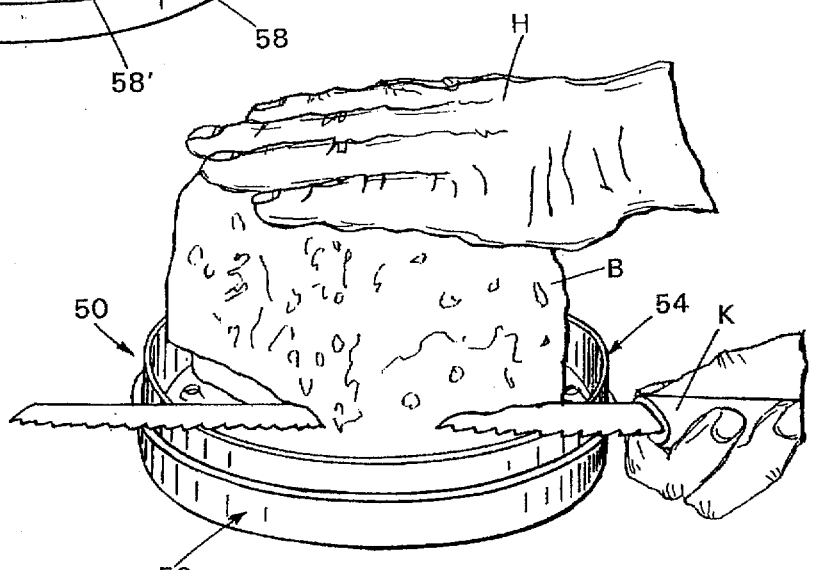
FIG. 5 is a perspective view of the second embodiment in use.
Figure 6:
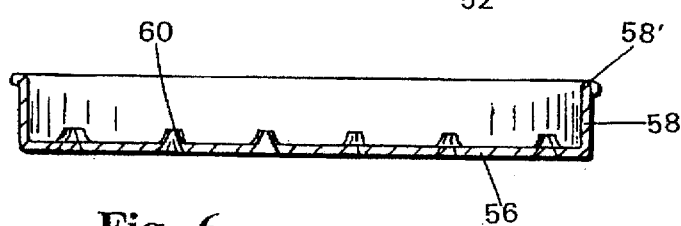
FIG. 6 is a cross sectional view of the bottom element of the second embodiment.
Figure 7:
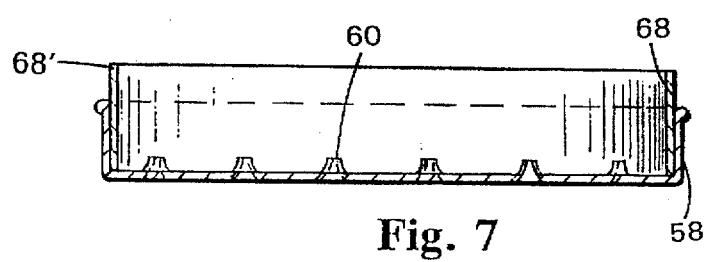
FIG. 7 is a sectional view of the bottom element in FIG. 6 cooperative with a telescopically interfitting vertical extension element.

If a thicker slice is desired, cylindrical element 54, which has a vertical rim 68 of a height greater than that of rim 58, is telescopically interfitted with rim 58, preferably by having an outer diameter slightly smaller than the inner diameter of rim 58 to interfit therewith as depicted in FIGS. 4, 5 and 7. Then, by placing the bread loaf B with its end down on protrusions 60 and pressing it downwardly sufficiently to cause puncturing of the loaf, the blade of knife K can be passed over the upper edge 68' while maintaining the knife continuously in contact with the upper edge, to cut the thicker slice. The bread is then removed and the slice retrieved.

With either embodiment, another advantage of the invention is the capacity of the device to neatly hold the bread in place to readily spread the bread slice with a spread such as peanut butter, butter, preserves or the like. This is particularly advantageous for freshly baked bread.

Conceivably certain variations of the preferred depicted embodiments may be made without departing from the concept set forth. Hence, the invention is not intended to be limited to the specific preferred illustrative embodiments, but only by the scope of the appended claims and the equivalents thereto.

The embodiments of the invention in which an exclusive property or privilege is claimed are defined as follows:

1. A bread slicing retainer and guide comprising:

a horizontal support surface and a vertical rim connected to and surrounding said horizontal support surface;

said support surface having a plurality of spaced, upwardly projecting, bread loaf penetrating protrusions to retain the end of a loaf of bread in a fixed position on said support surface when held down on said protrusions;

said vertical rim having a perimeter and extending upwardly with respect to said support surface a predetermined height, and having an upper edge forming a planar rim guide surface; and a ring having a perimeter of a size to telescopically interfit with said rim, said ring being telescopically interfitted with said rim and having a height greater than said predetermined height of said rim and extending above said rim, and said ring having an upper edge forming a planar ring guide surface for guiding a knife to cut a slice of bread to a uniform first thickness which is substantially equal to said height of said ring;

whereby said rim guide surface acts as a guide for said knife when said ring is separated from said rim to cut a slice of bread to a uniform second thickness which is substantially equal to said predetermined height of said rim and less that said uniform first thickness.

2. A bread slicing retainer and guide comprising:

a horizontal support and a vertical rim connected to and surrounding said horizontal support, said support having a first and a second support surface;

said first support surface having a plurality of spaced, upwardly projecting, bread loaf penetrating protrusions to retain the end of a loaf of bread in a fixed position on said first support surface when held down on said protrusions;

said vertical rim having a first rim portion extending upwardly with respect to said first support surface a predetermined height, said first rim portion having an upper edge forming a first planar guide surface for engagement by a knife for continuous contact therewith to cut a slice of bread to a uniform first thickness which is substantially equal to said predetermined height; and said vertical rim having a second rim portion extending downwardly with respect to said second support surface a different amount than said predetermined height, said second rim portion having a lower edge forming a second planar guide surface for engagement by said knife, and said second support surface having a second set of projecting bread loaf penetrating protrusions such that by inverting said bread loaf retainer and holding the end of said loaf of bread on said second support surface, a uniform slice of different thickness than said uniform first thickness can be cut.

\* \* \* \* \*